US012761841B2

(12) United States Patent
Niimoto

(10) Patent No.: US 12,761,841 B2
(45) Date of Patent: Oct. 13, 2026

(54) IMAGE FORMING APPARATUS USING A DIFFERENT RETRY INTERVAL TO REQUEST CONTRACT INFORMATION DEPENDING ON A SERVICE TO WHICH THE CONTRACT INFORMATION RELATES, METHOD, AND NON-TRANSITORY COMPUTER-READABLE STORAGE MEDIUM STORING PROGRAM

(71) Applicant: Canon Kabushiki Kaisha, Tokyo (JP)

(72) Inventor: Keisuke Niimoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 261 days.

(21) Appl. No.: 18/415,734

(22) Filed: Jan. 18, 2024

(65) Prior Publication Data

US 2024/0248655 A1 Jul. 25, 2024

(30) Foreign Application Priority Data

Jan. 24, 2023 (JP) ................................ 2023-008952

(51) Int. Cl.
*G06F 3/12* (2006.01)

(52) U.S. Cl.
CPC ............ *G06F 3/1224* (2013.01); *G06F 3/121* (2013.01); *G06F 3/1288* (2013.01)

(58) Field of Classification Search
CPC ...... G06F 3/1224; G06F 3/121; G06F 3/1288; G06F 3/1239
See application file for complete search history.

(56) References Cited

U.S. PATENT DOCUMENTS

| | | | | |
|---|---|---|---|---|
| 10,859,960 | B2 * | 12/2020 | Ushinohama | G03G 15/5091 |
| 2021/0122165 | A1 * | 4/2021 | Watanabe | G06F 3/1287 |
| 2021/0237494 | A1 * | 8/2021 | Mikami | B41J 29/38 |
| 2022/0050646 | A1 * | 2/2022 | Kojima | G06F 3/1219 |
| 2022/0137897 | A1 * | 5/2022 | Hattori | G06F 3/1229 358/1.15 |
| 2022/0171576 | A1 * | 6/2022 | Yamada | B41J 2/17546 |
| 2022/0321728 | A1 * | 10/2022 | Minamiyama | G06F 3/1285 |

FOREIGN PATENT DOCUMENTS

JP 2022032194 A 2/2022

* cited by examiner

*Primary Examiner* — Nicholas Pachol
(74) *Attorney, Agent, or Firm* — Venable LLP

(57) ABSTRACT

An image forming apparatus includes: a request unit that requests, of a server, information concerning a first service and a second service which are executable by the image forming apparatus; and a control unit that controls the request to the server in a case where the request to the server by the request unit is repeated. The control unit controls the request to the server so that the request to the server is made at a frequency determined based on information indicating a contract state concerning the first service executable by the image forming apparatus.

17 Claims, 9 Drawing Sheets

| SERVICE | SERVICE STATUS | PRINTER FUNCTION RESTRICTION | FREQUENCY OF RE-ACQUISITION OF CONTRACT INFORMATION |
|---|---|---|---|
| A SERVICE | UNCONTRACTED | (THIS STATUS IS NOT PRESENT) | |
| | WAIT FOR SERVICE AUTHENTICATION | PRESENT | FREQUENCY: HIGH (RETRY IN 10 SECOND INTERVALS) |
| | START SERVICE | – | – |
| B SERVICE | UNCONTRACTED | NO | FREQUENCY: LOW (NO RETRY. UPON USER OPERATION) |
| | WAIT FOR SERVICE AUTHENTICATION | NO | |
| | START SERVICE | – | – |

FIG. 7

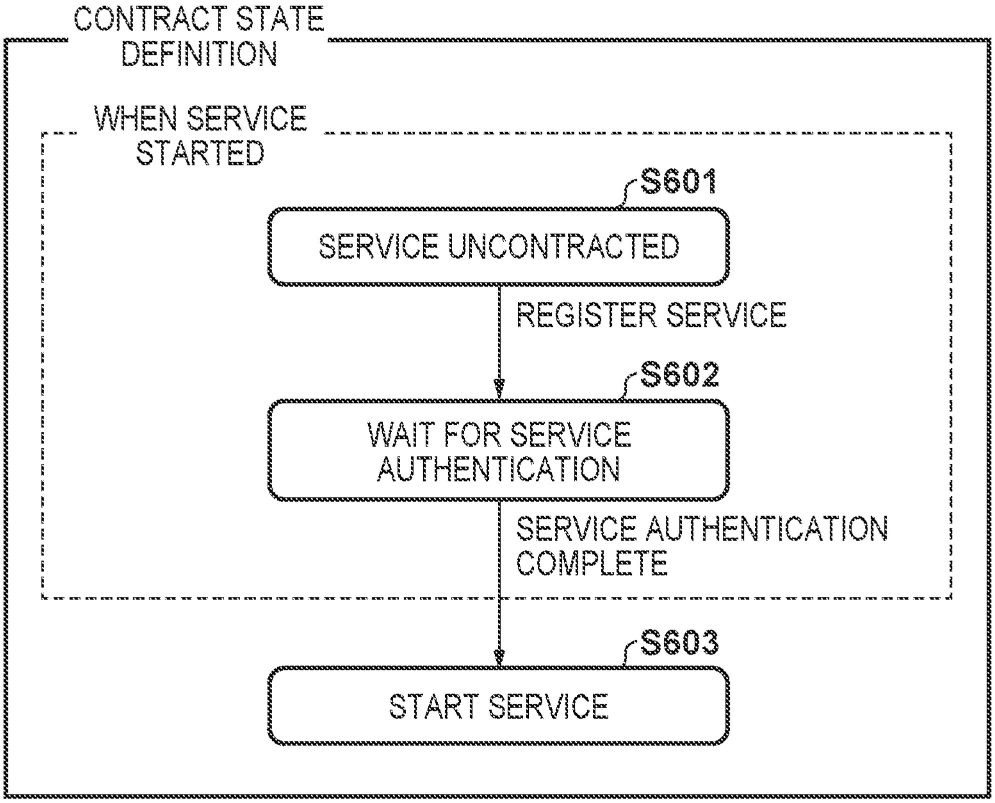

FIG. 8

| SERVICE | SERVICE STATUS | PRINTER FUNCTION RESTRICTION | FREQUENCY OF RE-ACQUISITION OF CONTRACT INFORMATION |
|---|---|---|---|
| A SERVICE | UNCONTRACTED | (THIS STATUS IS NOT PRESENT) | |
| | WAIT FOR SERVICE AUTHENTICATION | PRESENT | FREQUENCY: HIGH (RETRY IN 10 SECOND INTERVALS) |
| | START SERVICE | – | – |
| B SERVICE | UNCONTRACTED | NO | FREQUENCY: LOW (NO RETRY. UPON USER OPERATION) |
| | WAIT FOR SERVICE AUTHENTICATION | NO | |
| | START SERVICE | – | – |

FIG. 11

| SERVICE | CONTRACT STATE | PRINTER FUNCTION RESTRICTION | CONTRACT INFORMATION RE-ACQUISITION FREQUENCY/ CONTRACTED STATE MONITORING FREQUENCY |
|---|---|---|---|
| A SERVICE | UNCONTRACTED | (THIS STATUS IS NOT PRESENT) | |
| | WAIT FOR SERVICE AUTHENTICATION | PRESENT | FREQUENCY: HIGH (RETRY IN 10 SECOND INTERVALS) |
| | START SERVICE | PRESENT | FREQUENCY: HIGH (REGULAR POLLING) |
| | CANCELLED/STOPPED | PRESENT | |
| | PURCHASED | NO | FREQUENCY: LOW (UPON USER OPERATION) |
| B SERVICE | UNCONTRACTED | NO | FREQUENCY: LOW (NO RETRY. UPON USER OPERATION) |
| | WAIT FOR SERVICE AUTHENTICATION | NO | |
| | START SERVICE | NO | FREQUENCY: LOW (UPON USER OPERATION) |
| | CANCELLED/STOPPED | NO | |
| | PURCHASED | (THIS STATUS IS NOT PRESENT) | |

IMAGE FORMING APPARATUS USING A DIFFERENT RETRY INTERVAL TO REQUEST CONTRACT INFORMATION DEPENDING ON A SERVICE TO WHICH THE CONTRACT INFORMATION RELATES, METHOD, AND NON-TRANSITORY COMPUTER-READABLE STORAGE MEDIUM STORING PROGRAM

BACKGROUND OF THE INVENTION

Field of the Invention

The present invention relates to an image forming apparatus communicable with a server, a method, and a non-transitory computer-readable storage medium storing a program.

Description of the Related Art

An image forming apparatus having a network function transmits device information and the use history of a user to a management server, thereby implementing various services such as failure analysis and an accounting system.

For example, there is a service in which a management server manages a consumable such as ink and the consumable is automatically delivered when the remaining amount becomes small. Furthermore, in recent years, flat-rate services for which neither the initial investment cost nor the maintenance cost is incurred by lending a device main body and a consumable to a user who contracts a subscription service have become popular.

In such contract-type flat-rate service, an image forming apparatus communicates with a management server to acquire, from the management server, information concerning the service such as the contract status of the service, and controls the image forming apparatus in accordance with the information. For example, before service authentication for confirming that the contract-type flat-rate service is contracted is completed, the use of the image forming apparatus is restricted. Japanese Patent Laid-Open No. 2022-32194 describes an arrangement in which after registering user information and information concerning a printing apparatus, a server notifies a host terminal that a contract for using a flat-rate service is complete.

SUMMARY OF THE INVENTION

In an arrangement in which an image forming apparatus acquires information concerning a service from a server, it is necessary to quickly acquire the information and suppress the access load on the server.

The present invention provides, in an arrangement in which an image forming apparatus acquires information concerning a service from a server, the image forming apparatus for quickly acquiring the information and suppressing the access load on the server, a method, and a non-transitory computer-readable storage medium storing a program.

The present invention in one aspect provides an image forming apparatus comprising: at least one memory and at least one processor which function as: a request unit configured to request, of a server, information concerning a first service and a second service which are executable by the image forming apparatus; and a control unit configured to control the request to the server in a case where the request to the server by the request unit is repeated, wherein the control unit controls the request to the server so that the request to the server is made at a frequency determined based on information indicating a contract state concerning the first service executable by the image forming apparatus.

According to the present invention, in an arrangement in which an image forming apparatus acquires information concerning a service from a server, it is possible to quickly acquire the information and suppress the access load on the server.

Further features of the present invention will become apparent from the following description of exemplary embodiments with reference to the attached drawings.

BRIEF DESCRIPTION OF THE DRAWINGS

FIG. 7 is a view for explaining transition of a service state;

FIG. 8 is a table for explaining control of a re-request to acquire service contract information;

FIG. 11 is a table for explaining control of a request to acquire service contract information.

DESCRIPTION OF THE EMBODIMENTS

Figure 1:
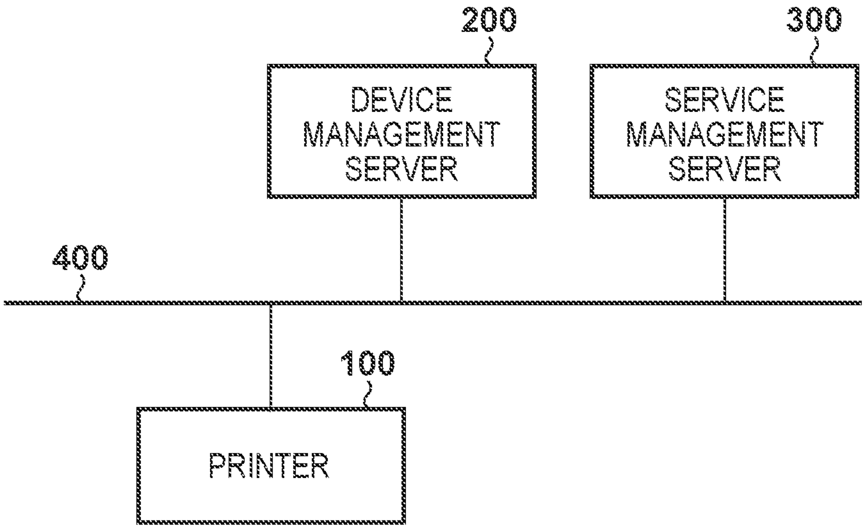
FIG. 1 is a block diagram showing the overall arrangement of a processing system.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram showing an example of the overall arrangement of a processing system according to this embodiment. This processing system includes an image forming apparatus 100 as a processing apparatus, a device management server 200, and a service management server 300. The device management server 200 and the service management server 300 can provide a subscription service to an image forming apparatus having a network function. For example, such system is implemented that the remaining amount of a consumable member such as ink of the image forming apparatus 100 having a print function is transmitted as log information to the server system and, in a case where the remaining amount is smaller than a threshold, the consumable member is automatically delivered to the home of the user of the image forming apparatus 100.

The respective apparatuses shown in FIG. 1 are communicably connected to each other via a network 400 such as the Internet. A CPU 101 of the image forming apparatus 100 stores service contract information in an internal nonvolatile memory 104, and controls the operation of the image forming apparatus 100 based on the service contract information. The device management server 200 is a server that manages a device in a subscription service system. Furthermore, the device management server 200 holds service contract information notified from the service management server 300, and provides the service contract information to the image forming apparatus 100. The service contract information held by the device management server 200 includes pieces of contract information of a plurality of services. In this embodiment, three services are given as examples of the plurality of services. The first service is a subscription service for lending, an image forming apparatus and a consumable of the image forming apparatus to a user at a flat rate. This service is called a main body-inclusive flat-rate service. The second service is a subscription service for providing, at a flat rate, a consumable to a user who has purchased an image forming apparatus. This service is called a consumable flat-rate service. The third service is a mileage service for giving points in accordance with the number of print sheets and the number of ink replacements, and allowing a user to use the points to purchase a product. FIG. 1 shows only the service management server 300 but a notification of the contract information of each service is sent from a service management server corresponding to the service in this embodiment. That is, in the arrangement shown in FIG. 1, there may be a plurality of service management servers corresponding to the plurality of services. The image forming apparatus 100 acquires the service contract information by communicating with the device management server 200 via the network 400. A communication protocol such as Hypertext Transfer Protocol (HTTP) is used for communication between the image forming apparatus 100 and the device management server 200 and service management server 300. In this embodiment, the device management server 200 is located between the image forming apparatus 100 and the service management server 300 but the present invention is not limited to this arrangement. For example, the image forming apparatus 100 and the service management server 300 may directly transmit/receive the service contract information via the Internet. Furthermore, the device management server 200 and the service management server 300 may be formed as one server apparatus, and may include other server functions. Note that the service contract information and control of the operation of the image forming apparatus 100 based on the service contract information will be described later.

FIG. 1 shows an example of the arrangement of the processing system, and an apparatus not shown in FIG. 1, for example, a router may be included. For example, in a case where the image forming apparatus 100 is installed in the home of the user, the image forming apparatus 100 is connected to the Internet via a router or the like, and can communicate with the device management server 200 and the service management server 300 via the network 400. In this case, although not shown in FIG. 1, an information processing apparatus held by the user may be included. The information processing apparatus held by the user is, for example, a smartphone or a PC, and may be directly communicable with the image forming apparatus 100 or may be communicable with the image forming apparatus 100 via a router having an access point function. The information processing apparatus is used for, for example, initial installation (setup) including processing of connecting, to the network 400, the image forming apparatus 100 delivered from a service provider. After the completion of the initial installation, for example, the information processing apparatus directly transmits image data created by an application to the image forming apparatus 100 or transmits the image data to the image forming apparatus 100 via a cloud server (not shown), thereby executing printing. FIG. 1 shows one image forming apparatus 100 but a plurality of image forming apparatuses 100 may be connected to the network 400. The network 400 is a network including a wired network, a wireless network, or both of them.

Figure 2:
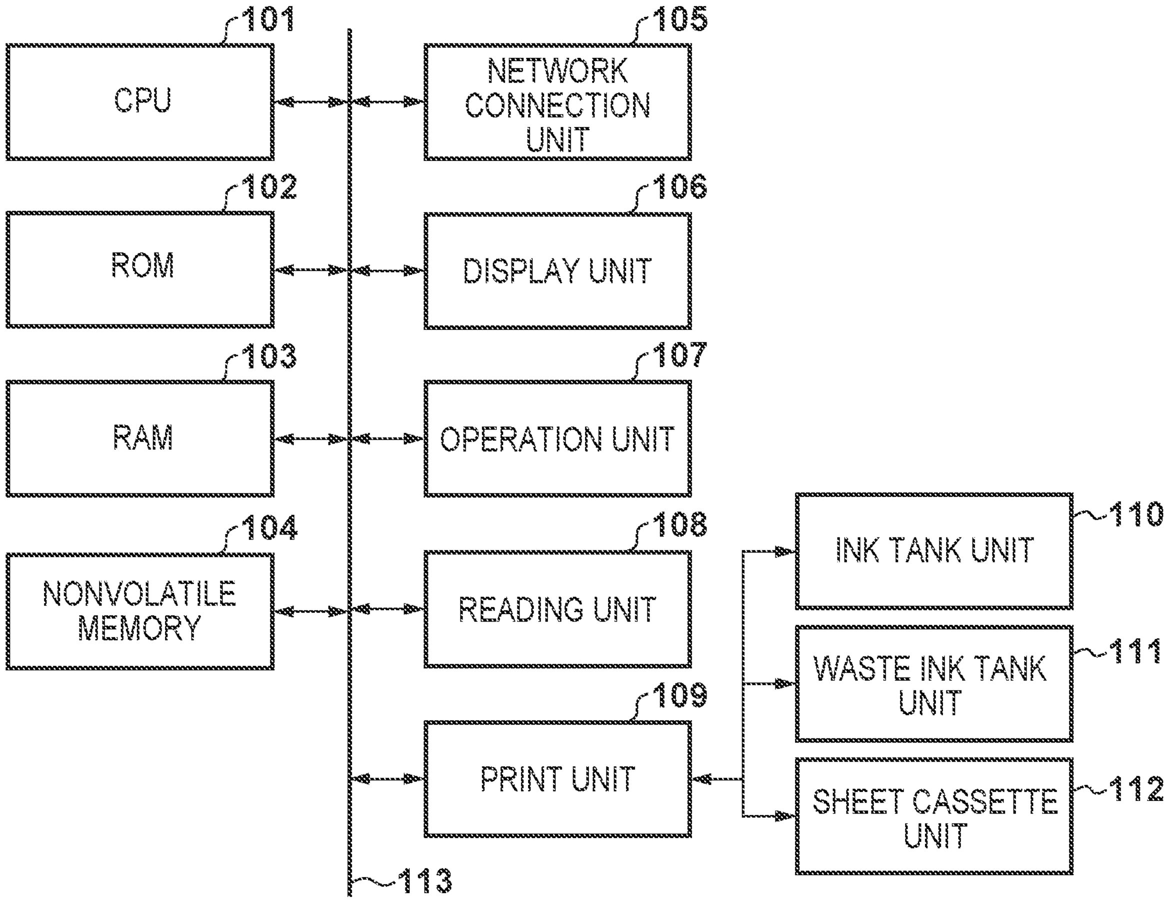
FIG. 2 is a block diagram showing the hardware arrangement of a printer.

FIG. 2 is a block diagram showing an example of the hardware arrangement of the image forming apparatus 100. The image forming apparatus 100 includes the CPU 101, a ROM 102, a RAM 103, and the nonvolatile memory 104. The CPU 101 is a central processing unit for comprehensively controlling the respective units in the image forming apparatus 100. The ROM 102 stores various program codes. The RAM 103 temporarily stores or buffers image data and the like at the time of executing each service. In addition, the RAM 103 stores image data and the like received by a network connection unit 105. The operation of the image forming apparatus 100 according to this embodiment is implemented when, for example, the CPU 101 reads out a program stored in the ROM 102 into the RAM 103 and executes the readout program. The nonvolatile memory 104 stores, for example, the individual identification information of the image forming apparatus 100, shipping destination information, a setting of a language displayed on a display unit 106, and the like. In this embodiment, service contract information (to be described later) is also stored in the nonvolatile memory 104.

The network connection unit 105 has an arrangement corresponding to a network medium, and implements communication with an external apparatus on a network. The network connection unit 105 can be connected to the external apparatus via a network, or can directly be connected to the external apparatus by a cable or the like. For example, the network connection unit 105 is connected to the external apparatus via a USB cable or a network. The image forming apparatus 100 can communicate with the device management server 200 and the service management server 300 via the network 400 by the network connection unit 105.

The display unit 106 is formed by, for example, a liquid crystal display (LCD) or the like, and can display characters, a graphic, an index (indicator), and the like. The display unit 106 is not limited to the liquid crystal display, and can be formed using an LED or another display. Examples of information displayed on the display unit 106 are setting information of the image forming apparatus 100 and information (a remaining ink amount) concerning ink stored in each ink tank. Note that the display unit 106 is controlled by the CPU 101. An operation unit 107 includes hard keys and switches for accepting various user operations. The display unit 106 may be configured to function as an operation unit for performing an input operation and the like, like a touch panel.

A reading unit 108 optically reads a document set on a document table (not shown), and converts it into electronic data. Furthermore, the reading unit 108 can transmit, to an external apparatus via the network 400, image data obtained by converting the electronic data into a designated file format, and store the image data in a memory area such as a hard disk (not shown). Furthermore, in a case where a copy function is implemented, the reading unit 108 reads a document placed on the document table to generate image data, and the generated image data is transferred to a print unit 109. The print unit 109 prints an image on a print medium such as a print sheet based on the image data. In the image forming apparatus 100, a scan function is implemented by the reading unit 108 and a print function is implemented by the print unit 109.

The print unit 109 is supplied with ink from an ink tank unit 110, and performs print processing on the print medium. For example, the print unit 109 prints an image on a print medium by an inkjet printing method based on the image data read by the reading unit 108 or the like. Note that the printing method of the print unit 109 is not limited to the inkjet printing method, and may be another printing method such as an electrophotographic printing method. Therefore, ink is used as an example of the consumable in this embodiment but toner may be used.

The ink tank unit 110 includes an ink injection port, and stores ink when ink is injected from an ink bottle. Note that as another arrangement, printing may be executable by attaching, as the ink tank unit 110, an ink cartridge filled with ink and supplying ink of the ink cartridge to the print unit 109. For example, the image forming apparatus 100 includes a carriage that can move the print unit 109 in a scanning direction with respect to the print medium. In this case, the carriage attached with the ink cartridge also forms the ink tank unit 110 according to this embodiment.

A waste ink tank unit 111 stores waste ink generated when the print unit 109 performs print processing using ink supplied from the ink tank unit 110. The waste ink indicates ink used not for discharge onto the print medium but for ink suction before discharging ink onto the print medium to stabilize ink discharge. Status information representing the remaining capacity of the waste ink tank unit 111 is obtained by calculating a remaining storable capacity based on the waste ink amount used by the print unit 109 outside the print medium and the capacity of the waste ink tank unit 111. At this time, it may be configured to correct the calculation result of the remaining capacity by mounting, on the waste ink tank unit 111, a sensor that detects the waste ink amount. It may also be configured to calculate the remaining storable capacity of the waste ink tank unit 111 only based on the detection result of the sensor.

A sheet cassette unit 112 stores a print medium to be supplied to the print unit 109. This embodiment will describe a sheet as an example of the print medium. The print unit 109 prints on a supplied sheet. Sheet information such as the remaining number of sheets in the sheet cassette unit 112 is calculated based on the number of sheets supplied to the print unit 109 and the number of sheets stored in the sheet cassette unit 112. Note that by mounting a sensor that detects the number of sheets stored in the sheet cassette unit 112, the calculation result of the remaining number of sheets may be corrected. The remaining number of sheets may be detected only based on the detection result of the sensor. The respective units of the image forming apparatus 100 are connected to each other via a bus 113, and can transmit/receive data to/from each other.

The image forming apparatus 100 is not limited to the arrangement shown in FIG. 2, and can appropriately include an arrangement corresponding to a function feasible by a device applied as the image forming apparatus 100. Referring to FIG. 2, the image forming apparatus 100 is shown as a Multi Functional Printer but may be a single function printer.

Figure 3:
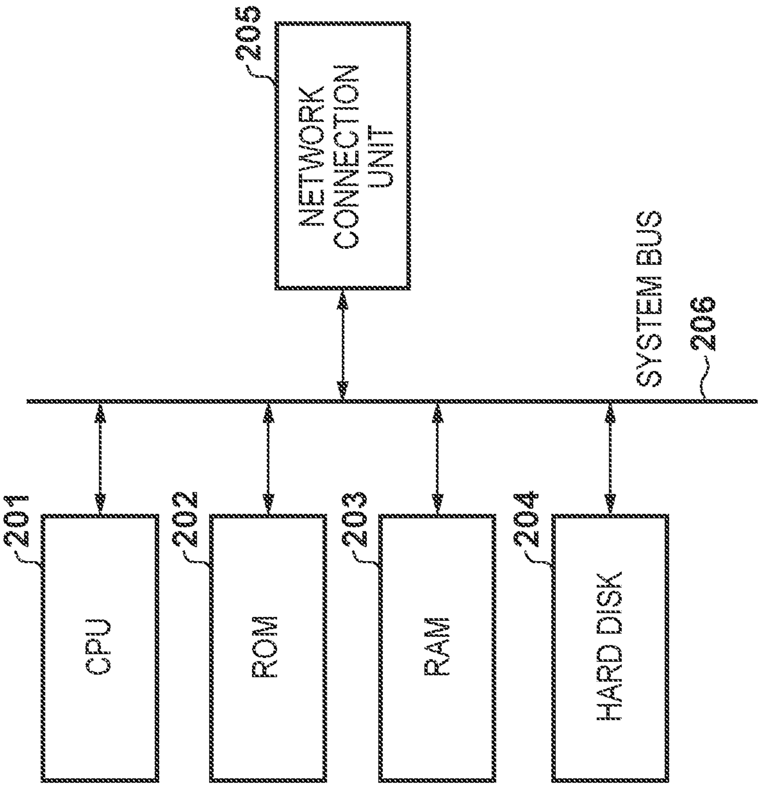
FIG. 3 is a block diagram showing the hardware arrangement of a device management server.

FIG. 3 is a block diagram showing an example of the hardware arrangement of the device management server 200. A CPU 201 comprehensively controls the interior of the device management server 200. The CPU 201 performs processing such as calculation, determination, and control of data and commands based on software or programs stored in a ROM 202, a RAM 203, or a hard disk 204. The RAM 203 is used as a temporary memory area when the CPU 201 performs various kinds of processes. The operation of the device management server 200 according to this embodiment is implemented when, for example, the CPU 201 reads out a program stored in the ROM 202 into the RAM 203 and executes the readout program. The hard disk 204 stores an operating system (OS), application software programs, and the like. Device information, consumable information, and the like for each printer are stored in the hard disk 204. In this embodiment, a table for storing information of the contract status of each service can also be stored in the hard disk 204. A system bus 206 transmits/receives data among the blocks of the CPU 201, the ROM 202, the RAM 203, and the hard disk 204. A network connection unit 205 has an arrangement corresponding to the network, and implements communication with an external apparatus on the network. For example, the network connection unit 205 performs data communication by a protocol such as TCP/IP on a wired LAN or a wireless LAN complying with a standard such as the IEE 802.11a standard.

Figure 4:
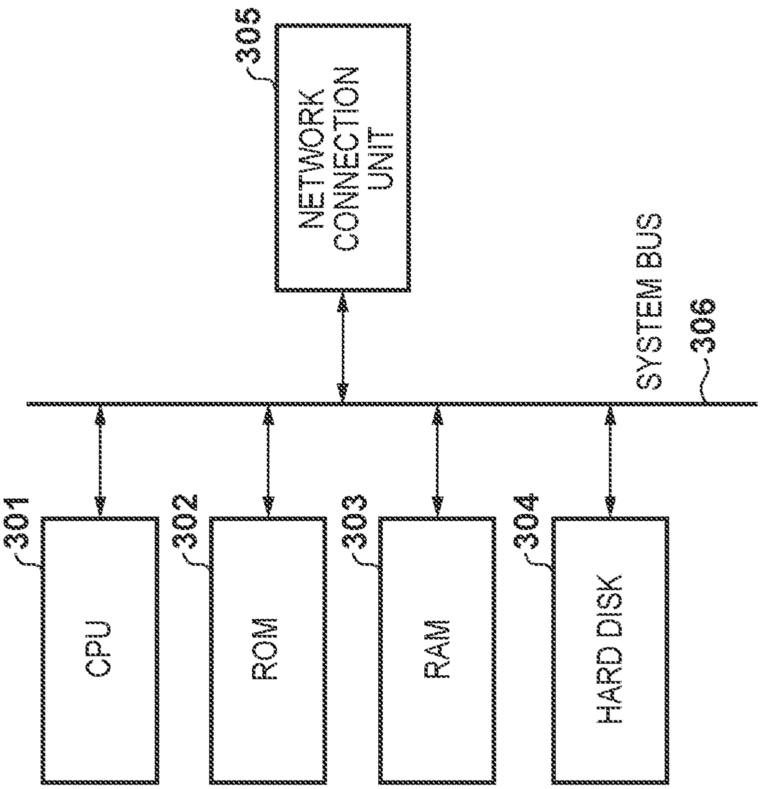
FIG. 4 is a block diagram showing the hardware arrangement of a service management server.

FIG. 4 is a block diagram showing an example of the hardware arrangement of the service management server 300. A CPU 301 comprehensively controls the interior of the service management server 300. The CPU 301 performs processing such as calculation, determination, and control of data and commands based on software or programs stored in a ROM 302, a RAM 303, or a hard disk 304. The RAM 303 is used as a temporary memory area when the CPU 301 performs various kinds of processes. The operation of the service management server 300 according to this embodiment is implemented when, for example, the CPU 301 reads out a program stored in the ROM 302 into the RAM 303 and executes the readout program. The hard disk 304 stores an operating system (OS), application software programs, and the like. In addition, a table for storing information of the contract status of each service is stored in the hard disk 304. A system bus 306 transmits/receives data among the blocks of the CPU 301, the ROM 302, the RAM 303, and the hard disk 304. A network connection unit 305 has an arrangement corresponding to the network, and implements communication with an external apparatus on the network. For example, the network connection unit 305 performs data communication by a protocol such as TCP/IP on a wired LAN or a wireless LAN complying with a standard such as the IEE 802.11a standard.

Note that the device management server 200 and the service management server 300 are not limited to the arrangements shown in FIGS. 3 and 4, respectively. For example, it may be configured to implement, using a server on a cloud, a service that can be provided by the device management server 200 or the service management server 300. Furthermore, each of the device management server 200 and the service management server 300 is not limited to an arrangement including one server. For example, each of the device management server 200 and the service management server 300 may be implemented by a server system formed from three or more servers or one integrated server.

A sequence from a service contract of a main body-inclusive flat-rate service to service authentication of the image forming apparatus 100 will be described next with reference to FIG. 5. The image forming apparatus 100 will be described as the printer 100 below but the image forming apparatus 100 is not limited to the print function, as described above. In S501 of FIG. 5, a user 500 makes a service contract on the service management server 300 that manages the service. For example, the user 500 contracts a subscription service (to be simply referred to as a service hereinafter) by accessing the URL of the service management server 300 and registering user information. Assume that the user 500 has not received the printer 100 at this time.

After the user 500 makes the service contract, the service management server 300 performs, in S502, service registration processing of linking the user information and the printer 100 as a registration target in the device management server 200. After the completion of the service registration processing, the printer 100 registered in S502 is delivered to the user 500 in S503. Note that at this time, the service management server 300 has recognized the linkage of service contract information and identification information of the printer 100 such as a product serial number.

In S504, upon receiving the printer 100, the user 500 unpacks the printer 100, and starts initial installation. In S505, the printer 100 executes initial installation processing in accordance with an operation of the user 500. In the initial installation processing, initial setting including network setting for connection to the Internet is performed. Upon completion of the connection to the network by the initial setting, the printer 100 sends, in S506, a device registration request to the device management server 200 together with the identification information of the printer 100. In S507, upon receiving the device registration request, the device management server 200 performs device registration processing based on the identification information received from the printer 100. Note that at this time, the device management server 200 does not recognize the service contract information linked with the identification information of the printer 100.

In S508, upon completion of the registration processing, the device management server 200 returns a registration result to the printer 100, and also sends a device registration completion notification to the service management server 300. At this time, the identification information of the printer 100 is transmitted to the service management server 300 together with the device registration completion notification. The device registration completion notification to the service management server 300 may be sent to a plurality of service management servers 300 for the respective services. In S509, the service management server 300 notifies the device management server 200 of the linked service contract information based on the identification information of the printer 100 which has been received together with the device registration completion notification from the device management server 200. At this time, the device management server 200 recognizes the service contract information linked with the identification information of the printer 100.

In this embodiment, the service contract information is used for activation at the time of initial setting of the apparatus. Therefore, the service contract information includes information for determining that the service contract has been concluded. The device management server 200 holds, in itself, the service contract information notified from the service management server 300.

In S510, if the printer 100 requests to acquire the service contract information, the device management server 200 transmits the held service contract information to the printer 100 by, for example, an HTTP response. Note that the request, from the printer 100, to acquire the contract information is a request to collectively acquire the contract states of the plurality of services, and is not a request issued for each service. That is, in this embodiment, the request to acquire the contract information is a request to collectively acquire pieces of contract information concerning the above-described main body-inclusive flat-rate service, consumable flat-rate service, and mileage service. Upon receiving the service contract information in response to the request in S510, the printer 100 stores the service contract information in the printer 100 and also reflects control corresponding to the service contract information on the subsequent operation of the printer 100 in S511. For example, if the printer 100 confirms, based on the contract information of the main body-inclusive flat-rate service among the acquired pieces of contract information of the plurality of services, that the service has been contracted, the printer 100 cancels the restrictions of the printer functions associated with the service, which have been restricted, and allows the user to use the printer functions. As an example, this embodiment will describe the case of the main body-inclusive flat-rate service in which the printer 100 is provided on the premise that the user 500 has contracted the service. Before the service contract information is received based on the request in S510 to confirm that the service has been contracted, all the basic functions of the printer 100 such as the print function, the scan function, and the copy function are restricted. On the other hand, after S511, these functions can be used by the user 500.

A sequence in a case where acquisition of the service contract information fails will be described next with reference to FIG. 6. In the example of FIG. 5, a case where the request to acquire the service contract information in S510 succeeds is shown. That is, when the service contract information notification is sent in S509 before the request to acquire the service contract information in S510, the printer 100 can acquire the service contract information. However, there is assumed a case where the service contract information notification in S509 is sent after the service contract information is acquired in S510 or communication via the Internet fails. That is, the request to acquire the service contract information in S510 does not always succeed. FIG. 6 shows an example of a case where the request to acquire the service contract information in S510 fails. That is, when the request to acquire the service contract information in S510 is sent, the device management server 200 has not been notified of the service contract information from the device management server 200. That is, the device management server 200 cannot transmit the service contract information in response to the request to acquire the service contract information, and thus the request to acquire the service contract information fails. S501 to S510 of FIG. 6 are the same as S501 to S510 of FIG. 5 and a description thereof will be omitted.

Figure 5:
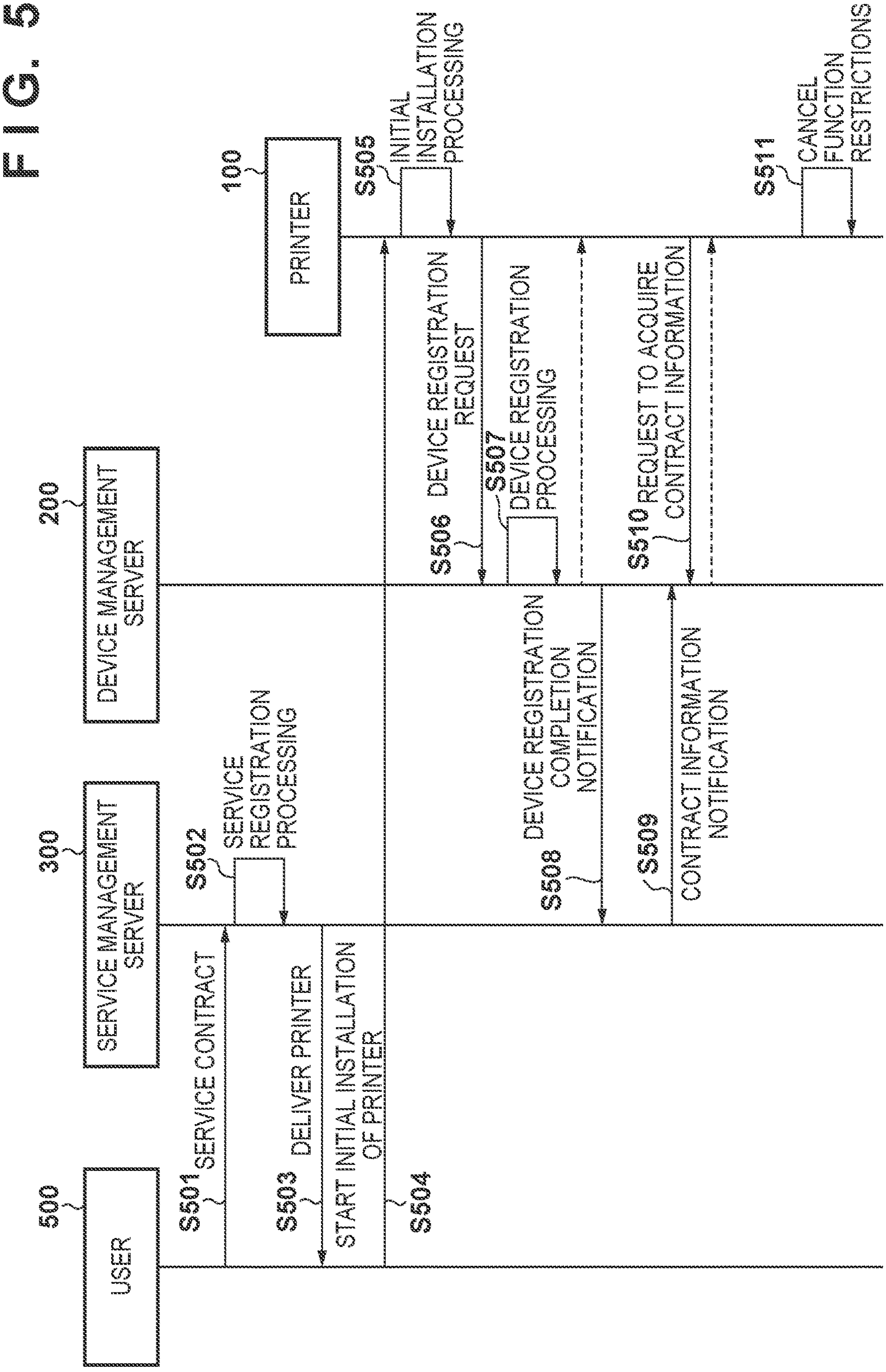
FIG. 5 is a sequence chart up to service authentication.
Figure 6:
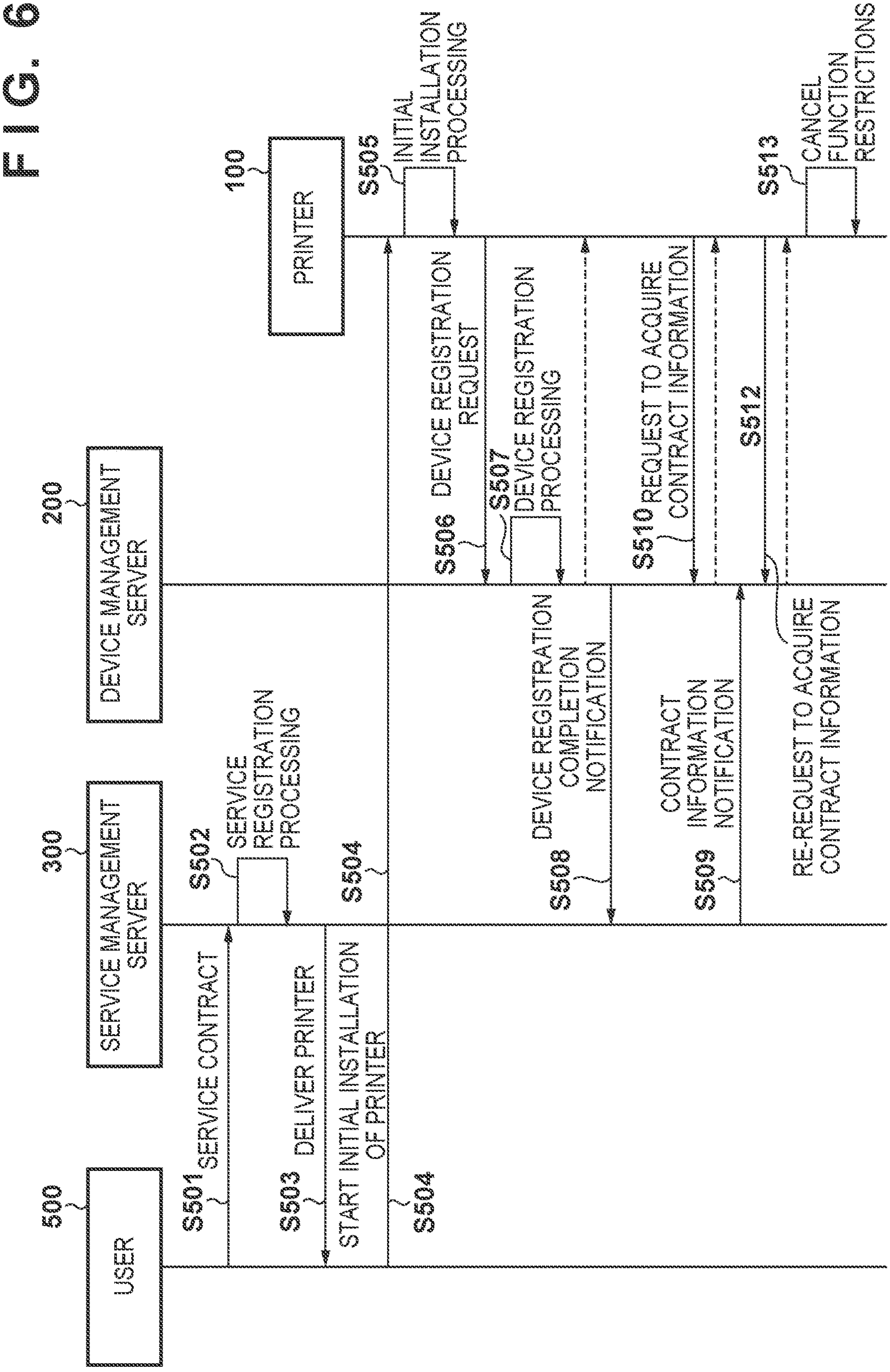
FIG. 6 is a sequence chart up to service authentication.

Unlike FIG. 5, in FIG. 6, the device management server 200 receives the request to acquire the service contract information in S510 after sending the device registration completion notification in S508 and before receiving the service contract information notification in S509. As described above, at this time, the device management server 200 has not received the service contract information notification from the service management server 300. Therefore, the device management server 200 cannot transmit the expected service contract information in response to the request to acquire the service contract information in S510. That is, although the user 500 has actually contracted the main body-inclusive flat-rate service in S501, the contents of main body-inclusive flat-rate service contract information in a response that is transmitted to the printer 100 in response to the request in S510 indicate "uncontracted". As a result, cancellation of the function restrictions, described in S511 of FIG. 5, is not performed and the functions linked with the contracted service are still restricted, thereby hindering the use of the printer 100 by the user 500. To cope with this, in this embodiment, if it is determined that the request to acquire the service contract information in S510 has failed, a re-request (retry) of the service contract information is sent in S512. The re-request to acquire the service contract information is also a request to collectively acquire the contract states of the plurality of services, similar to the first request.

Figure 12:
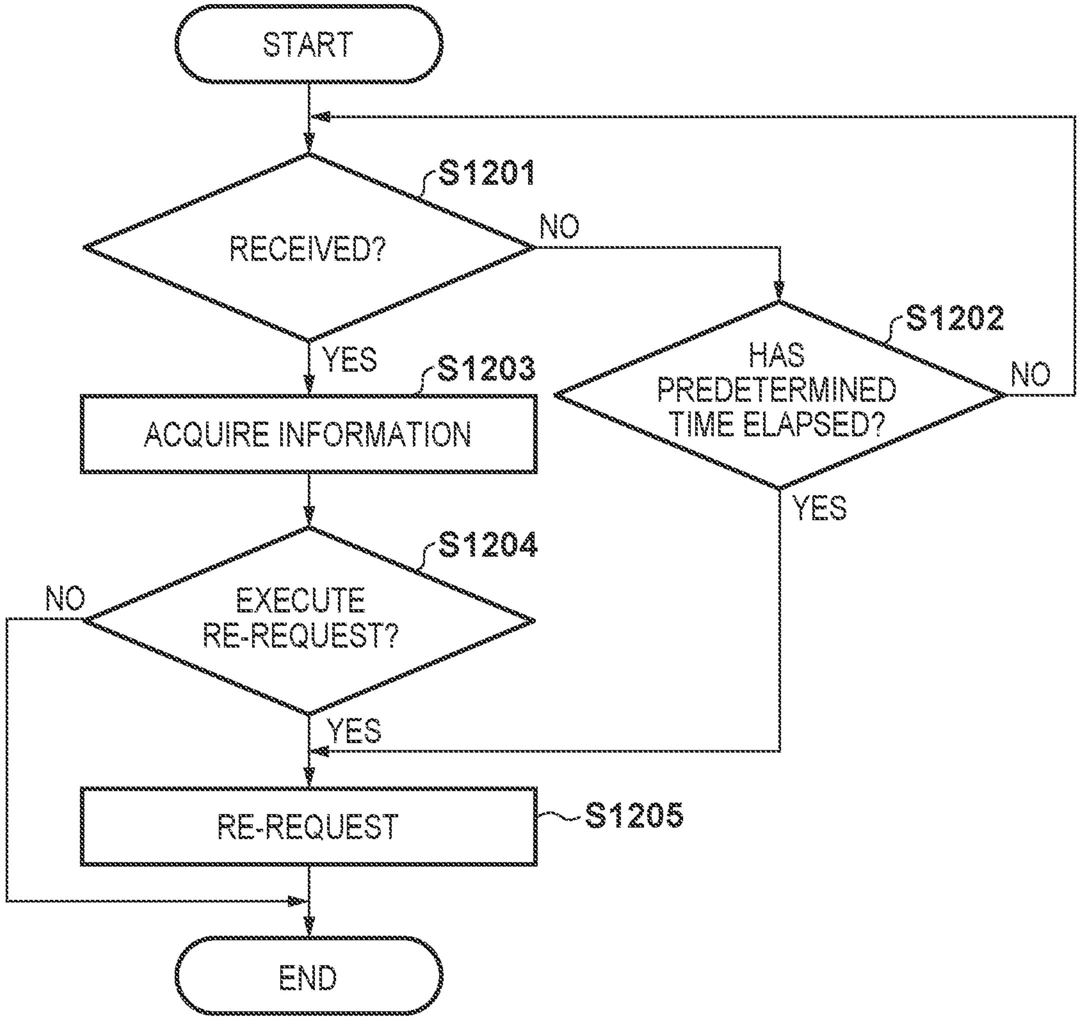
FIG. 12 is a flowchart illustrating determination processing of a re-request to acquire service contract information.

FIG. 12 is a flowchart illustrating processing executed after the request to acquire the service contract information is sent. The processing shown in FIG. 12 is implemented when, for example, the CPU 101 reads out a program stored in the ROM 102 into the RAM 103 and executes the readout program.

In step S1201, the CPU 101 determines whether a response to the request to acquire the service contract information is received. If it is determined that no response is received, the CPU 101 determines, in step S1202, whether a predetermined time elapses. The predetermined time is a time determined based on a predetermined response time when an HTTP response is received in response to an HTTP request, and is a time sufficiently shorter than an interval at which the request to acquire the contract information is repeated. If it is determined that the predetermined time has not elapsed, the processes from step S1201 are repeated. On the other hand, if it is determined that the predetermined time has elapsed, the CPU 101 determines, in step S1205, that the request to acquire the service contract information has failed, and re-requests to acquire the service contract information as the processing in S512. At this time, the frequency of the re-request is controlled in accordance with the service type, as will be described later. As described above, if the request to acquire the service contract information is sent in S510 and no service contract information is received even after the predetermined time elapses because of a communication delay or the like, the re-request is made to acquire the service contract information.

If it is determined in step S1201 that a response to the request to acquire the service contract information is received, the CPU 101 acquires, in step S1203, information of the received response. Then, in step S1204, the CPU 101 determines, based on the information of the received response, whether to re-request to acquire the service contract information. For example, in the case of the main body-inclusive flat-rate service, the determination processing is performed based on whether the information of the received response indicates an "uncontracted" status. As will be described later, the printer 100 holds, in the nonvolatile memory 104, state information indicating the service state (service status) of the service contract information of each service. This state information can appropriately be updated. For example, if the user 500 makes a service contract in S501, the printer 100 delivered to the user 500 holds information of "service authentication waiting state" in advance. In this state, the service contract information normally received from the device management server 200 never indicates "uncontracted". That is, if the information of "contracted" is acquired in step S1203, it is understood that the device management server 200 has not received the service contract information notification from the service management server 300. Therefore, in this case, it is determined that the request to acquire the service contract information has failed, and in step S1205, the CPU 101 re-requests to acquire the service contract information as the processing in S512. At this time, the frequency of the re-request is controlled in accordance with the service type, as will be described later. Alternatively, the determination processing in step S1204 may be performed based on the service state of the printer 100 and the received service contract information. More specifically, if the service state of the printer 100 is "service authentication waiting state", and the received service contract information indicates "uncontracted", it is determined to make a re-request.

On the other hand, if it is determined not to re-request to acquire the service contract information because the information of the response received in step S1204 does not indicate "uncontracted", the processing shown in FIG. 12 ends. Then, the printer 100 stores the service contract information in the nonvolatile memory 104 of the printer 100, and also reflects control corresponding to the service contract information on the subsequent operation of the printer 100. As described above, for example, if the received service contract information indicates an inappropriate status such as the "uncontracted" status, the re-request is made to acquire the service contract information. If the received information indicates that the response is not an appropriate response to the request, such as an error associated with a communication failure like a response error, instead of the processing in step S1202, it may be determined in step S1204 to re-request to acquire the service contract information.

The re-request to acquire the service contract information in S512 is a request to collectively acquire the contract states of the plurality of services, similar to S510, and is not issued for each service. If the re-request is made to acquire the service contract information in S512, and the service contract information is successfully acquired, the printer 100 cancels, in S513, for example, the restrictions of the functions linked with the service, as control corresponding to the service contract information. As described above, according to this embodiment, if it is determined in S510 that the request to acquire the service contract information has failed, the re-request can be made to acquire the service contract information in S512. Furthermore, in this embodiment, the frequency of the re-request to acquire the service contract information in S512 is changed in accordance with the service type for which the contract information needs to be re-acquired.

The re-request to acquire the service contract information in S512 will further be described next with reference to FIGS. 7 and 8. First, the definition of the service state in the printer 100 at the start of the service will be described with reference to FIG. 7.

The printer 100 can be set in a plurality of service states concerning the service contract, as shown in FIG. 7. That is, the printer 100 can be set in a service uncontracted state of S601, a service authentication waiting state of S602, and a service start state of S603. The state information shown in FIG. 6 is stored in a predetermined memory area of the nonvolatile memory 104, and is sequentially updated, as follows. In other words, the service state of the printer 100 transitions along with update of the state information stored in the nonvolatile memory 104.

The service uncontracted state of S601 indicates a state in which the user 500 has not made a service contract in S501. This is the state of the printer 100 in a case where the service management server 300 has not accepted a service contract in S501 of FIG. 5 from the user 500. If the user 500 makes a service contract in S501, the printer 100 transitions from the service uncontracted state of S601 to the service authentication waiting state of S602. The service authentication waiting state indicates a state in which a service contract has been made on the service management server 300 but the printer 100 does not recognize that the service contract has been made. This corresponds to the state of the printer 100 before the service contract information is received from the device management server 200.

If the device management server 200 is notified of the service contract information from the service management server 300, and then the printer 100 acquires the service contract information from the device management server 200, the printer 100 recognizes that the service contract has been made. In this case, the printer 100 transitions from the service authentication waiting state of S602 to the service start state of S603. After transitioning to the service start state, with respect to the main body-inclusive flat-rate service, the restrictions of the functions linked with the service are canceled and the service is started in the printer 100. This corresponds to the state of the printer 100 after S511 of FIGS. 5 and S513 of FIG. 6.

With respect to a service for which the user optionally makes a service contract, like the consumable flat-rate service and the mileage service, the printer 100 starts from the uncontracted state when the user obtains the printer 100. If the user 500 makes a service contract, the printer 100 transitions to the service authentication waiting state of S602. On the other hand, in the case of a service based on a service contract, like the main body-inclusive flat-rate service shown in FIGS. 5 and 6, a service contract has been made when the printer 100 is delivered to the user 500 in S503. That is, in this case, the printer 100 starts from the service authentication waiting state of S602.

Control of the frequency of the re-request to acquire the service contract information in accordance with a service type will be described next with reference to FIG. 8. In other words, control of the frequency is control of a repetition interval. In this example, two types of services A and B will be described as service types. Service A is a service provided based on a service contract, like the main body-inclusive flat-rate service shown in FIGS. 5 and 6, and the printer functions are restricted before the printer is set in the service start state. On the other hand, service B is a service for which the user can arbitrarily select whether to make a service contract, like the consumable flat-rate service or the mileage service, and the functions of the printer 100 are not restricted in accordance with the service state including the service uncontracted state. The user may make a contract for both services A and B depending on the example of service B. For example, there is a case where the user contracts the main body-inclusive flat-rate service as service A, and contracts the mileage service as service B.

In this embodiment, the CPU 101 controls the frequency of the re-request to acquire the service contract information based on the information shown in FIG. 8. Note that the information shown in FIG. 8 may be stored in, for example, the nonvolatile memory 104.

As described above, in the case of service A based on a service contract, if the user makes a service contract in S501, the printer 100 starts from the service authentication waiting state, as described above. For example, when the device registration request is transmitted to the device management server 200 in S506 of FIG. 6, the printer 100 is in the service authentication waiting state. Then, the request to acquire the service contract information is transmitted to the device management server 200 in S510, and step S1205 of FIG. 12 is executed. For example, if no response is transmitted from the device management server 200 for a predetermined time or if it is determined, based on the fact that the response indicates "uncontracted", that the device management server 200 has not received the service contract information notification, step S1205 of FIG. 12 is executed. In this case, the CPU 101 recognizes that the printer 100 is in the service authentication waiting state of service A, and thus re-requests, at, for example, an interval of 10 sec for 1 min, to acquire the service contract information. If no service contract information can be acquired in 1 min, the request to acquire the service contract information is temporarily stopped. Then, if the CPU 101 detects an operation of the printer 100 by the user 500, it re-requests again, at an interval of 10 sec for 1 min, to acquire the service contract information. The operation of the printer 100 by the user is, for example, reception of a job from an external apparatus or the operation unit 107 of the printer, setting of the printer 100, and change of a power supply state. The above frequency of the re-request is merely an example, and is not limited to the above-described time interval. Note that each of the request in S510 and the re-request in step S1205 is a request to collectively acquire the pieces of contract information of the plurality of services. That is, a response to the request includes the contract information of the consumable flat-rate service or the mileage service as service B in addition to the contract information of the main body-inclusive flat-rate service as service A. For example, as an example, assume that the response includes the contract information of the main body-inclusive flat-rate service as service A and the contract information of the mileage service as service B. In this case, if it is determined that it is necessary to make a re-request with respect to service A regardless of whether the contract information of service B is "uncontracted" or whether the service state concerning service B is "service authentication waiting state", the pieces of contract information of the plurality of services are collectively re-requested at a high frequency such as an interval of 10 sec.

As described above, the state in which the service functions are restricted can quickly be canceled by re-requesting, at a high frequency, to acquire the service contract information.

On the other hand, assume that the user 500 contracts service B, a request to acquire the service contract information is transmitted to the device management server 200 by the same processing as in S510, and acquisition of the contract information fails to execute step S1205 of FIG. 12. For example, if no response is returned from the device management server 200 for a predetermined time, step S1205 of FIG. 12 is executed. If it is determined that the device management server 200 has not received the service contract information notification from the service management server 300 corresponding to service B because the response indicates "uncontracted" although the printer 100 is in the service authentication waiting state, step S1205 of FIG. 12 is executed. Assume here that acquisition of the contract information concerning service A has not failed. More specifically, this is a case where the printer 100 acquires, as the contract information of service A, information indicating "contracted", and the service state of the printer 100 is the service start state. That is, this is a case where information indicating "uncontracted" is not acquired as the contract information of service A and it is not determined that it is necessary to make a re-request with respect to service A. In this case, the CPU 101 does not re-request to acquire the service contract information before the user operates the printer 100 next. That is, control is executed to reduce the frequency of the re-request to acquire the service contract information, as compared with a case where it is necessary to re-acquire the contract information of service A.

As described above, by relatively reducing the frequency of the re-request to acquire the service contract information, it is possible to suppress the access load caused by many printers on the market accessing the device management server 200 at a high frequency.

As described above, according to this embodiment, the frequency of the re-request to acquire the service contract information is controlled in accordance with the characteristic of the service for which it is necessary to re-acquire the contract information. With this arrangement, it is possible to suppress the access load caused by many printers on the market accessing the device management server 200 at a high frequency. With respect to a service provided based on a service contract, if a request to acquire service contract information fails, it is possible to quickly cancel the restrictions of the functions of the printer 100 in accordance with the characteristic of the service by making a re-request at a high frequency.

Second Embodiment

The second embodiment will be described below concerning points different from the first embodiment. The first embodiment has explained the arrangement in which a re-request is made to acquire the service contract information in S512 of FIG. 6 before the printer 100 transitions to the service start state. This embodiment will additionally describe a case in which a user 500 cancels a service or changes the contract contents of a service after transitioning to the service start state.

Figure 9:
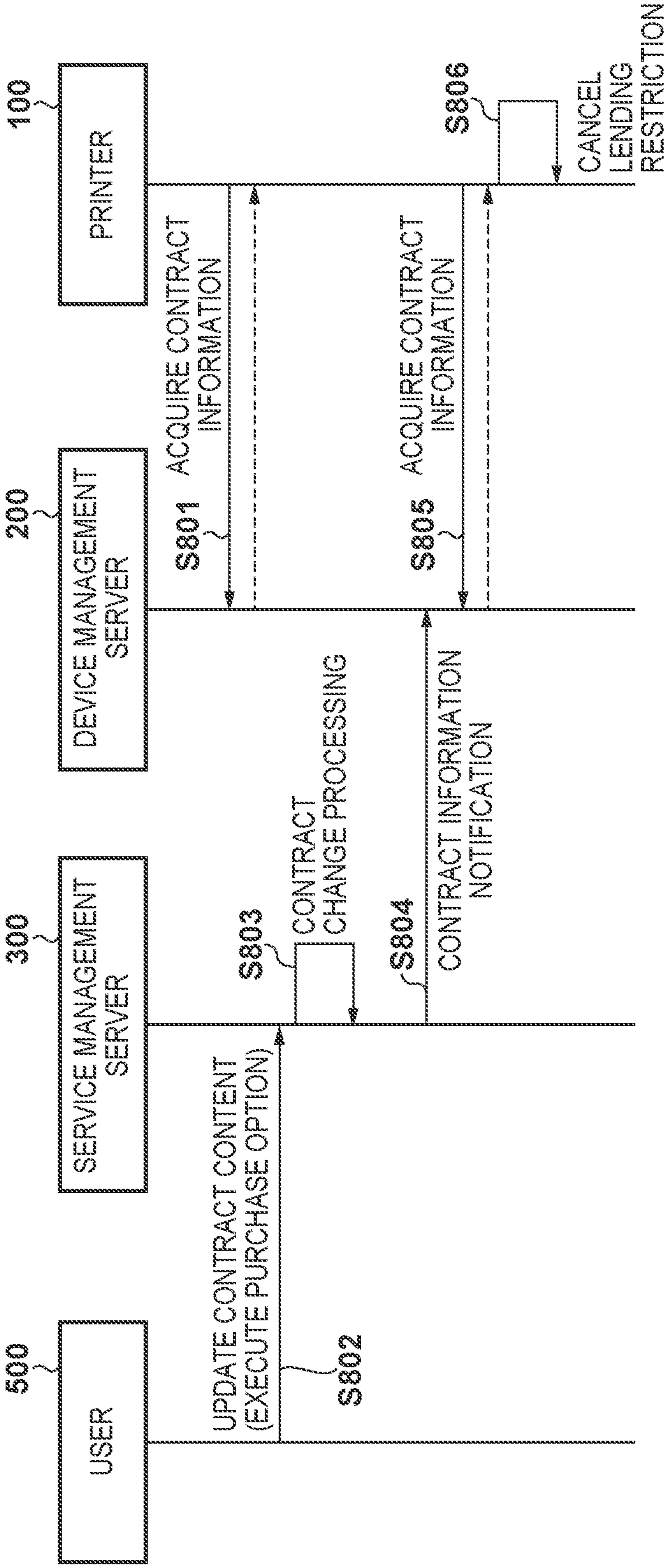
FIG. 9 is a sequence chart when the contract contents of a service are changed.

A sequence when the user 500 changes the contract contents of a service in the service start state of a printer 100 will be described below with reference to FIG. 9. In the service start state, the printer 100 monitors the change of service contract information by requesting a device management server 200 to acquire the service contract information at a predetermined time interval (S801 and S805). In this embodiment, a request to acquire the service contract information, which is made at a predetermined time interval after transitioning to the service start state, will be referred as polling hereafter, and is discriminated from a re-request (retry) to acquire the service contract information before transitioning to the service start state, as described in the first embodiment. In this arrangement, assume that the user 500 changes the contract contents of the service on a service management server 300 in S802. For example, the user 500 accesses the URL of the service management server 300 by a held information processing apparatus or the like, and changes the currently contracted service contents, thereby changing the service contract.

The form of the main body-inclusive flat-rate service in which the printer 100 is lent to the user 500 based on a service contract already made in S501 is assumed here. Then, the service is provided with a purchase option as an optional contract. The user 500 can purchase the lent printer 100 by executing the purchase option. By executing the purchase option, the restrictions of functions, a use method, and the like in a case where the printer 100 is lent are canceled. For example, by canceling the restrictions, the restriction of the use in an offline environment and the restriction of replacement with a consumable that can be purchased on the market are canceled. This embodiment assumes a case in which the user 500 executes the purchase option in S802.

Based on the fact that the user 500 changes the service contents in S802, the service management server 300 executes, in S803, contract change processing (update processing) of the service registered with respect to the user 500. Note that at this time, the device management server 200 does not recognize that the service contract information linked with the printer 100 has been updated.

Then, in S804, the service management server 300 notifies the device management server 200 of the updated service contract information. The device management server 200 holds the service contract information notified from the service management server 300 in the device management server 200. The device management server 200 recognizes that the service contract information linked with the printer 100 has been updated.

Then, when the printer 100 requests to acquire the service contract information by polling in S805, the device management server 200 notifies the printer 100 of the held updated service contract information by, for example, an HTTP response. Similar to the first embodiment, the request (polling) to acquire the service contract information is a request to collectively acquire the contract states of a plurality of services, and is not issued for each service.

Upon receiving the updated service contract information from the device management server 200, the printer 100 stores the updated service contract information in a nonvolatile memory 104 in S806. Then, control corresponding to the updated service contract information is reflected on the subsequent operation of the printer 100. In this example, after S806, the restriction of the use in the offline environment and the restriction of replacement with a consumable that can be purchased on the market, which have been set as restrictions in a case where the printer 100 has been lent, are canceled.

In addition, by shortening the polling interval of the request to acquire the service contract information in S801 or S805, the updated service contract information can quickly be reflected on the operation of the printer 100. However, if many printers on the market execute polling at a high frequency, the access load on the device management server 200 becomes heavy. Therefore, in this embodiment, the polling frequency of the request to acquire the service contract information in S801 or S805 is controlled in accordance with a target service type. As a result, it is possible to quickly reflect the updated service contract information on the operation of the printer 100 and to suppress the access load on the device management server 200.

The request (polling) to acquire the service contract information in S801 or S805 will further be described next with reference to FIGS. 10 and 11. First, the definition of a service state in the printer 100 at the start of the service will be described with reference to FIG. 10.

Figure 10:
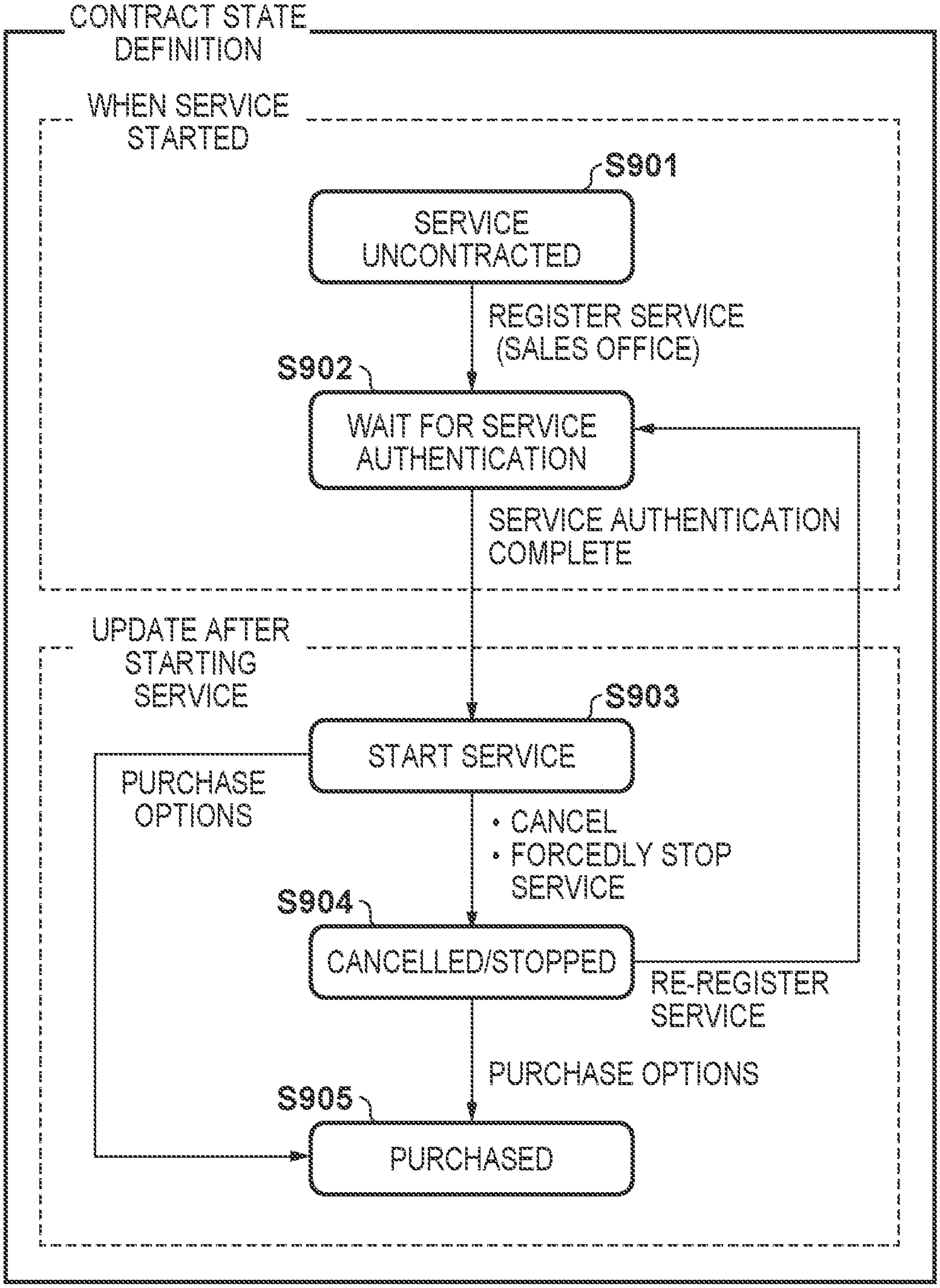
FIG. 10 is a view for explaining transition of a service state.

In this embodiment, the printer 100 can be set in a plurality of service states concerning a service contract, as shown in FIG. 10. That is, the printer 100 can be set in a service uncontracted state of S901, a service authentication waiting state of S902, a service start state of S903, a cancel/stop state of S904, and a purchased state of S905. S901, S902, and S903 are the same as S601, S602, and S603 of FIG. 6 and a description thereof will be omitted. The state information shown in FIG. 9 is stored in a predetermined memory area of the nonvolatile memory 104, and is sequentially updated, as will be described below. In other words, the service state of the printer 100 transitions along with update of the state information stored in the nonvolatile memory 104.

If the user 500 cancels the service on the service management server 300 in the service start state of S903, or service provision is stopped due to violation of service use, the printer 100 transitions to the cancel/stop state of S904. In the cancel/stop state, the user 500 cannot receive provision of the service, and the functions of the printer 100 are restricted in a case where the printer 100 is lent based on the service contract. If a service contract is made again on the service management server 300 in the cancel/stop state of S904, the printer 100 transitions from the cancel/stop state of S904 to the service authentication waiting state of S902.

On the other hand, if, in the service start state of S903 or the cancel/stop state of S904, the user 500 changes the contract contents of the service on the service management server 300, in this example, the user executes the purchase option, the printer 100 transitions to the purchased state of S905. In the purchased state, the lending restrictions of the printer 100 is canceled, and it is possible to use the printer 100 as the printer 100 owned by the user in the offline environment and to replace the consumable with a consumable that can be purchased on the market.

Control of the polling frequency of the request to acquire the service contract information in accordance with a service type will be described next with reference to FIG. 11. In this example, two types of services A and B will be described as service types. Service A is a service provided based on a service contract, like the main body-inclusive flat-rate service shown in FIGS. 5 and 6, and the printer functions are restricted before the printer is set in the service start state. Even after transitioning to the service start state, some functions, the use method, and the like are restricted as the lending restrictions. However, if the user 500 executes the purchase option and the printer transitions to the purchased state, all the restrictions are canceled.

On the other hand, service B is a service for which the user can arbitrarily select whether to make a service contract, like the consumable flat-rate service or the mileage service, and the functions of the printer 100 are not restricted in accordance with the service state including the service uncontracted state. Since the printer 100 is owned by the user, there is no purchase option for service B, and thus there is no purchased state.

The service authentication waiting state of service A in FIG. 11 is the same as in FIG. 8. That is, if it is determined that acquisition of the service contract information of service A fails, a CPU 101 re-requests, at, for example, an interval of 10 sec for 1 min, to acquire the service contract information. If no service contract information can be acquired in 1 min, the CPU 101 temporarily stops the request to acquire the service contract information. Then, if the CPU 101 detects a user operation of the printer 100 by the user 500, it re-requests again, at an interval of 10 sec for 1 min, to acquire the service contract information. Note that the above frequency of the re-request is merely an example, and is not limited to the above-described time interval.

After the printer 100 transitions to the service start state, the CPU 101 executes, at an interval of 1 min, polling of the request to acquire the service contract information to monitor the change of service contract information. More specifically, if the CPU 101 determines that the service state of service A of the printer 100 is "service start state", the CPU 101 executes polling at an interval of 1 min. After the printer 100 transitions to the cancel/stop state, the CPU 101 executes, at, for example, an interval of 1 min, polling of the request to acquire the service contract information to monitor the change of service contract information. Note that the above polling interval is merely an example, and is not limited to the above-described time interval.

As described above, by executing, at a high frequency, polling of the request to acquire the service contract information after transitioning to the service start state, it is possible to quickly cancel the state in which the service functions are restricted, when, for example, the purchase option is executed.

After the printer 100 transitions to the purchased state, the CPU 101 does not periodically request to acquire the service contract information, and requests to acquire the service contract information at a timing when the user 500 operates the printer 100 next. That is, control is performed to reduce the frequency of the request to acquire the service contract information, as compared with the cases of other service states.

As described above, by relatively reducing the frequency of the re-request to acquire the service contract information, it is possible to suppress the access load caused by many printers on the market accessing the device management server 200 at a high frequency.

The uncontracted state and the service authentication waiting state of service B in FIG. 11 are the same as in FIG. 8. That is, even if it is determined that acquisition of the service contract information of service B has failed, if it is not determined that acquisition of the service contract information of service A has failed, the CPU 101 does not re-request to acquire service contract information until the user operates the printer 100 next.

Then, after the printer 100 transitions to the service start state, the CPU 101 does not periodically request to acquire the service contract information, and requests to acquire the service contract information at a timing when the user 500 operates the printer 100 next. Even after the printer 100 transitions to the cancel/stop state, the CPU 101 does not periodically request to acquire the service contract information, and requests to acquire the service contract information at a timing when the user 500 operates the printer 100 next. That is, control is performed to reduce the frequency of the request to acquire the service contract information, as compared with the case of service A.

As described above, by relatively reducing the frequency of the re-request to acquire the service contract information, it is possible to suppress the access load caused by many printers on the market accessing the device management server 200 at a high frequency.

As described above, according to this embodiment, the frequency of the request to acquire the service contract information is controlled in accordance with the characteristic of the service. With this arrangement, it is possible to suppress the access load caused by many printers on the market accessing the device management server 200 at a high frequency. Furthermore, since the change of the service contract information such as execution of the purchase option is monitored at a short polling interval, that is, at a high frequency, it is possible to quickly cancel the restrictions of the printer functions in accordance with the characteristic of the service.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-008952, filed Jan. 24, 2023, which is hereby incorporated by reference herein in its entirety.

What is claimed is:

1. An image forming apparatus comprising:

at least one memory and at least one processor which function as:

a request unit configured to request, of a server, contract information for causing the image forming apparatus to be in a state corresponding to a service; and a control unit configured to retry the request to the server in a case where the contract information is not obtained as a result of the request to the server by the request unit, wherein the control unit controls to differentiate a retry interval between a case that the request of first contract information for causing the image forming apparatus to be in a state corresponding to a first service is retried and a case that the request of second contract information for causing the image forming apparatus to be in a state corresponding to a second service is retried.

2. The apparatus according to claim 1, wherein the state corresponding to the first service is a state in which a function of the image forming apparatus is restricted, and the state corresponding to the second service is a state in which the function of the image forming apparatus is not restricted.

3. The apparatus according to claim 2, wherein the retry interval of the request of the first contract information is shorter than the retry interval of the request of the second contract information.

4. The apparatus according to claim 2, wherein the control unit retries the request of the first contract information to the server every time a predetermined time elapses.

5. The apparatus according to claim 2, wherein the control unit retries the request of the second contract information to the server based on a fact that a user operation on the image forming apparatus is accepted.

6. The apparatus according to claim 1, wherein the control unit further controls to differentiate the retry interval of the request to the server between before and after the image forming apparatus is in the state corresponding to the first service.

7. The apparatus according to claim 6, wherein the retry interval of the request of the first contract information to the server before the image forming apparatus is in the state corresponding to the first service is shorter than the retry interval of the request to the server after the image forming apparatus is in the state corresponding to the first service.

8. The apparatus according to claim 6, wherein the image forming apparatus is in a state which is initially installed before the image forming apparatus is in the state corresponding to and the first service.

9. The apparatus according to claim 6, wherein the image forming apparatus is in a state that the first service is started after the image forming apparatus is in the state corresponding to the first service.

10. The apparatus according to claim 9, wherein after the image forming apparatus is in the state corresponding to the first service, the request to the server is retried to monitor a change from the first service to the second service.

11. The apparatus according to claim 6, wherein the at least one processor further functions as a storage unit configured to store information indicating a state of the image forming apparatus, and the control unit retries the request to the server based on the information indicating the state of the image forming apparatus stored in the storage unit.

12. The apparatus according to claim 1, wherein the first service is a service that requires a contract by a user, and the second service is a service that does not require a contract by the user.

13. The apparatus according to claim 12, wherein the first service includes a lending service of the image forming apparatus, and the second service includes a purchase service of the image forming apparatus.

14. The apparatus according to claim 12, wherein the first service and the second service are subscription services.

15. The apparatus according to claim 1, wherein the image forming apparatus is a printer.

16. A method comprising:

requesting, of a server, contract information for causing an image forming apparatus to be in a state corresponding to a service; and controlling to retry the request to the server in a case where the contract information is not obtained as a result of the request to the server, wherein the controlling is performed to differentiate a retry interval between a case that the request of first contract information for causing the image forming apparatus to be in a state corresponding to a first service is retried and a case that the request of second contract information for causing the image forming apparatus to be in a state corresponding to a second service is retried.

17. A non-transitory computer-readable storage medium storing a program configured to cause a computer to function to:

request, of a server, contract information for causing an image forming apparatus to be in a state corresponding to a service; and control to retry the request to the server in a case where the contract information is not obtained as a result of the request to the server, wherein the control is performed to differentiate a retry interval between a case that the request of first contract information for causing the image forming apparatus to be in a state corresponding to a first service is retried and a case that the request of second contract information for causing the image forming apparatus to be in a state corresponding to a second service is retried.

* * * * *